No. 737,811. PATENTED SEPT. 1, 1903.
W. F. ALTENBAUGH.
MACHINE FOR GRINDING TUMBLERS.
APPLICATION FILED APR. 18, 1903.
NO MODEL. 3 SHEETS—SHEET 2.
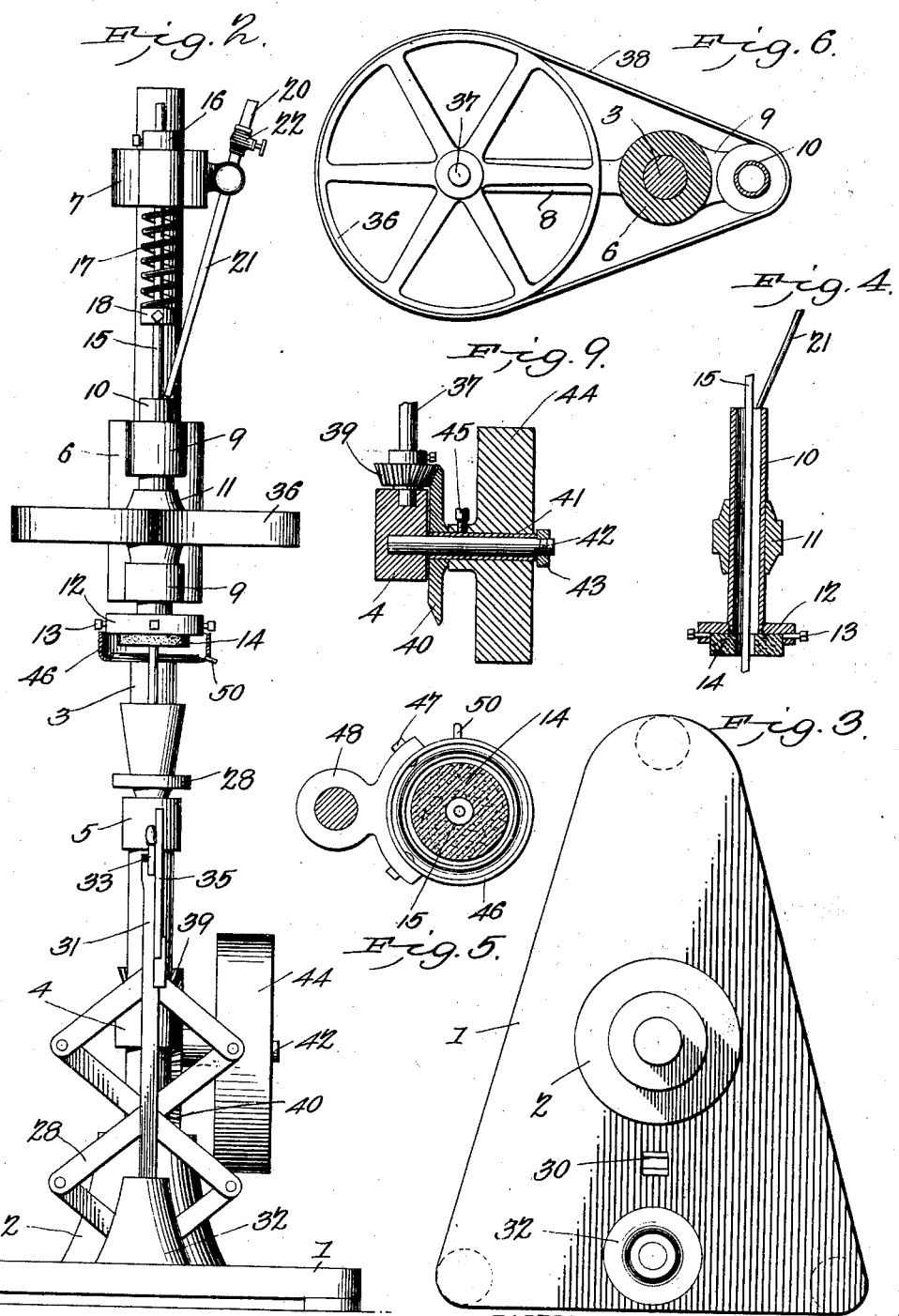

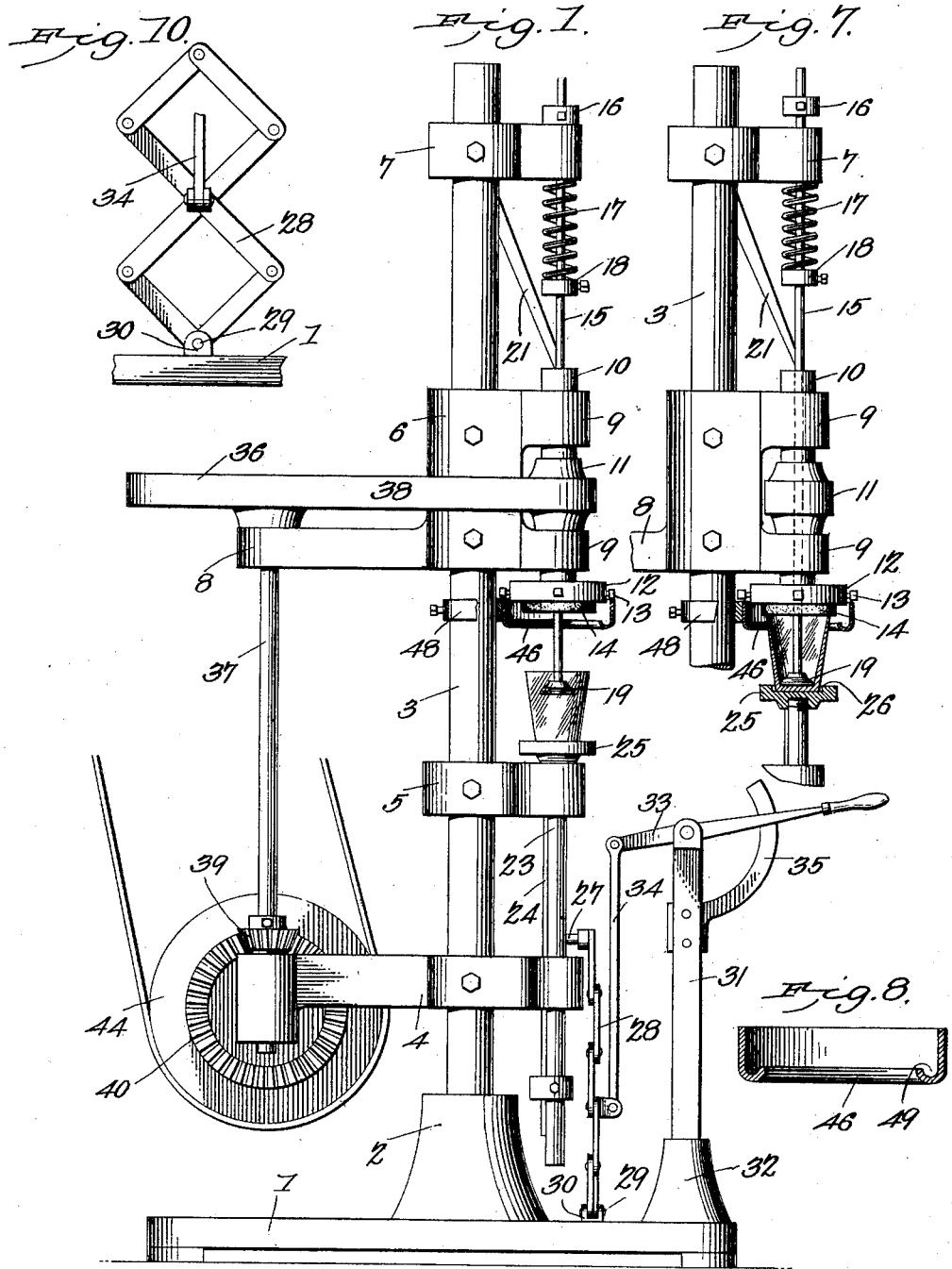

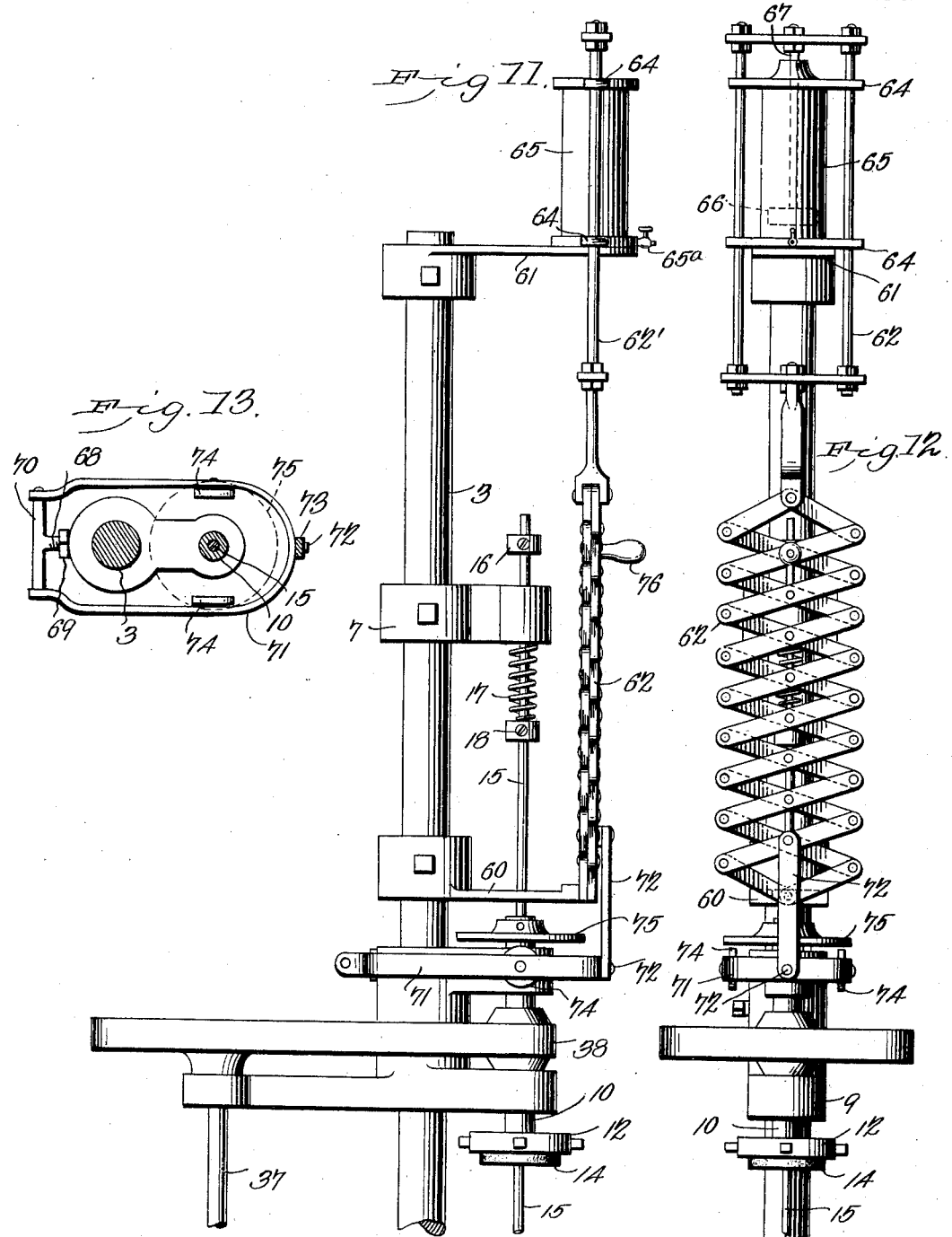

No. 737,811. Patented September 1, 1903.

UNITED STATES PATENT OFFICE.

WILLIAM FRANCIS ALTENBAUGH, OF TIFFIN, OHIO.

MACHINE FOR GRINDING TUMBLERS.

SPECIFICATION forming part of Letters Patent No. 737,811, dated September 1, 1903.

Application filed April 18, 1903. Serial No. 153,289. (No model.)

*To all whom it may concern:*

Be it known that I, WILLIAM FRANCIS ALTENBAUGH, a citizen of the United States, residing at Tiffin, in the county of Seneca and State of Ohio, have invented a new and useful Machine for Grinding Tumblers, of which the following is a specification.

This invention relates to machines for grinding tumblers, and more especially for grinding the upper margin of the bowls of thin glass tumblers, punch-cups, and the like, though the invention may be applied to machines for grinding the upper edges of other glass articles.

The object of the invention is to provide a grinding-machine of simple construction which may be operated at small expenditure of power and which will hold the tumblers or other glass articles in such a way that a minimum of breakage results in the grinding process.

In machines for grinding glass tumblers as ordinarily constructed the holding devices grip the bowls of the tumblers on the outer surface thereof and any irregularity in the form of the tumbler is apt to cause breakage of the tumbler during the grinding process. This is especially true of tumblers of blown glass, in which it is common for the bowl to be slightly flattened laterally, so as not to be circular in cross-section, and owing to such irregularity in form the ordinary holder presses upon the bowl of the tumbler at a few points only and does not furnish enough support for the remaining portions of the bowl. In consequence of this incomplete contact of the holding device with the tumbler-bowls the pressure of the grinding device upon the tumbler causes a large percentage of breakage.

In order to do away with the excessive breakage which occurs in grinding tumblers with a machine employing holding devices that grip the lateral sides of the tumbler-bowls, I provide in my machine holding devices that operate on the bottom of the tumbler only, and hence do not cause any unequal pressure upon the sides of the tumbler. In this way I succeed in doing away with much of the breakage, and thereby saving a large amount of expense in manufacturing such tumblers.

In addition to the form of holding mechanism above mentioned my invention comprises the construction and combination of parts of a grinding-machine hereinafter fully described and claimed, and illustrated in the accompanying drawings, forming a part of this specification, in which corresponding parts are designated by the same characters of reference throughout, it being understood that changes may be made in the form, proportions, and exact mode of assemblage of the elements described and shown without departing from the spirit of the invention or losing any of the advantages thereof.

In the drawings, Figure 1 is a view in side elevation of the grinding-machine, showing a tumbler in position on the support provided therefor, but not securely held in position for grinding. Fig. 2 is a view in front elevation of the machine with the parts in the position shown in Fig. 1. Fig. 3 is a plan view of the base-plate of the machine. Fig. 4 is a detail view in section showing the means for supplying the water to the grinding-stone. Fig. 5 is a detail view in plan of a grinding-stone and a shield surrounding the stone to prevent the water thrown from the stone by centrifugal action from being scattered around the machine and over the operator. Fig. 6 is a detail view showing the pulleys and belt for rotating the spindle on which the grinding-stone is mounted. Fig. 7 is a detail view showing the operation of the device for holding the tumbler in position to be ground. Fig. 8 is a detail view showing the construction of the water-shield. Fig. 9 is a detail view in section showing the connection between the main driving-pulley and the shaft from which power is communicated to the grinding-shaft of the machine. Fig. 10 is a detail view showing the construction of the lazy-tongs by means of which the tumbler-support is raised. Fig. 11 is a view in side elevation of the upper portion of the machine with the attachment for automatically controlling the degree of pressure between the glass article and the grinding-stone. Fig. 12 is a front elevation of the portion of the machine shown in Fig. 11. Fig. 13 is a detail view in plan of the means for raising the spindle carrying the grinding-stone.

Referring to the drawings, 1 designates a base-plate upon which is supported in a boss 2 the main supporting-standard 3 of the machine. Adjustably mounted upon the main supporting-standard are castings 4, 5, 6, and 7 in the order named, starting from the bottom of the standard and going upward. The casting 6 is of irregular form, having an arm 8 projecting to the rear of the machine and provided with an opening for the passage of a shaft, as shown, and having two arms 9 9 projecting forward and spaced apart, as shown. The arms 9 9 are pierced by openings sufficiently large to permit the passage of a hollow spindle 10, provided with an enlargement 11, which serves as a pulley and lies between the projecting arms 9 9. Secured to the lower end of the hollow spindle is a chuck 12, in which is securely held by means of the radially-disposed clamp-screws 13 a stone 14 for grinding the upper rim of the tumblers. The stone 14 is centrally pierced, as shown, for the passage of a rod 15, which extends upward through the hollow spindle 10 and through an opening of just sufficient size to permit of its passage in the casting 7 at the top of the standard 3. The rod 15 is slidable in the bearing provided therefor in the casting 7, and its downward movement is limited by the adjustable collar 16, which rests upon the upper surface of the casting 7 and is secured to rod 15 by means of a set-screw, as shown. The rod 15 is normally forced downward by means of a spring 17, the upper end of which lies in contact with the under surface of the casting 7 and the lower end of which is in contact with a set-collar 18, adjustable upon rod 15 by means of a set-screw. At its lower end the rod 15 is provided with a block of rubber 19 of suitable form to pass downward to the bottom of a tumbler and to press uniformly upon the bottom thereof. The block of rubber 19, which will hereinafter be referred to as the "gripper-head," is supported at a predetermined distance below the stone 14 for reasons which will be hereinafter explained, the distance of the gripper-head below the stone being adjusted by means of the set-collar 16, mounted on rod 15.

Supported in a bracket provided at one side of the casting 7 is a tube 20, provided with a nozzle 21 and a valve 22 for controlling the passage of water therethrough. This tube 20 terminates within the upper end of the hollow spindle 10, and at its upper end is connected with a hose or other suitable pipe through which water is fed from any convenient source of supply. When the valve 22 is opened, the water passes from the tube 20 downward through the hollow spindle 10 and spreads over the under surface of the grinding-stone 14, being aided in spreading by the motion of the stone in grinding.

Passing through suitable openings provided therefor in the castings 4 and 5 is a reciprocable rod 23, provided with a key 24 to prevent rotation and having upon its upper end a supporting-disk 25, the upper surface of which is centrally recessed, so as to leave an upwardly-projecting annular flange 26 at the periphery. Projecting forward from the rod 23 is a lug or pin 27, which passes through the inner ends of the upper pair of links in the lazy-tongs 28, by means of which the upward movement is imparted to rod 23. The lowermost links of the lazy-tongs are mounted upon a pivot 29, provided in the bracket 30, secured to the base-plate 1, as shown. In order to cause the expansion and contraction of the lazy-tongs at will, I provide on a standard 31, mounted at the forward end of the base plate 1, in a suitable boss 32, a lever 33, which is connected with the lazy-tongs by means of a link 34, pivoted at one end to lever 33 and at the other to a projecting lug located at the middle of the lazy-tongs. To secure the lever 33 in any desired position, the standard 31 has attached thereto a segmental rack 35, the teeth of which are placed close together, as shown, in order to permit fine adjustment.

In order to rotate the spindle 10, I provide at the rear of the casting 6 a pulley 36, which is rigidly secured to a shaft 37, which passes downward through bearings formed in the casting 6 and has its lower end inserted into a socket provided therefor in the casting 4, as shown in Fig. 9. A belt 38 runs over the pulley 36 and enlargement 11 on the hollow spindle, which also serves as a pulley. Motion is imparted to shaft 37 by means of a bevel-gear. (Illustrated in Fig. 9.) A small bevel-pinion 39 is rigidly mounted upon the shaft 37 at a point just above the socket formed in casting 4, and is in mesh with a larger bevel-pinion 40, which is rigidly mounted on a sleeve 41, journaled on a stud 42, which projects laterally from the casting 4, as shown. The sleeve is secured in position upon the stud by means of a nut 43, provided at the end of the stud, and there is also mounted upon the sleeve the main driving-pulley 44, which is secured in position by means of a set-screw 45, located in the hub thereof.

In order to prevent the water passed downward through the hollow spindle 10 to the grinding-stone 14 from being thrown around the machine and over the operator, the annular shield 46, attached by means of bolts 47 to the curved arms of a bracket 48, is provided. The bracket 48 is fitted upon the standard a little below the casting 6, and the shield 46 is held in such position that it surrounds the chuck 12 and the stone 14 mounted thereon, thus preventing the water from flying outward from the margin of the rapidly-revolving grinding-stone.

The annular shield 46 is at its lower margin bent inward and curved upward, as shown in Fig. 8, thus forming a trough 49, in which the water that escapes from the grinding-stone and strikes against the annular shield collects and flows outward through a drain-pipe 50, which is secured to the shield, as indicated in Fig. 5.

When my machine is to be used for grinding tumblers, set-collar 16 upon the rod 15 should be placed in such position that the gripper-head 19 at the lower end of the rod 15 is at a distance below the under surface of the grinding-stone 14 slightly in excess of the height of the tumblers to be ground. The tension of the spring 17 should be adjusted so that the pressure of the gripper-head upon the bottom of a tumbler when the tumbler is brought into grinding position will be sufficient to hold the tumbler firmly upon the supporting-disk 25 and hold the tumbler in contact therewith without slipping.

Requisite adjustment of the holding devices having been made, water is allowed to flow downward from the nozzle 21 of the tube 20 through the hollow spindle 10 and over the lower face of the grinding-stone 14, and the machine is set in motion by means of the driving devices already described, power being supplied to the main driving-pulley by a belt driven from any suitable motor. A tumbler is then placed in position upon the supporting-disk 25 and is raised into contact with the grinding-stone by means of the lever 33. Before the upper margin of the tumbler reaches the grinding-stone the presser-head 19 at the lower end of rod 15 will engage with the inner surface of the bottom of the tumbler, holding the tumbler firmly in contact with the supporting-disk 25 and keeping the tumbler perfectly stationary. By means of the lever 31 the force with which the tumbler is pressed against the under surface of the grinding-stone 14 may be made as great or as small as is necessary. At the beginning of the operation the pressure of the tumbler against the grinding-stone is naturally light, but as the irregular surface is gradually worn down increased pressure may be applied so as to insure perfectly uniform grinding.

During the grinding process the flow of water through the tube 20 is continued in order to avoid excessive heat where the grinding-stone comes in contact with the tumbler to insure smoother and more successful grinding.

When the upper surface of the tumbler has been ground to the desired degree the lever 31 will be swung upward and the supporting-disk 25 lowered to remove the tumbler from contact with the grinding-stone, the parts of the machine being returned to the position shown in Figs. 1 and 2.

It will be observed that by means of a machine constructed in the manner above described it is possible to grind glass tumblers with great rapidity, it being unnecessary to stop the rotation of the grinding-stone to introduce and remove tumblers from the machine, and that the tumblers may be held in contact with the stone with just the right degree of pressure at all times during the grinding process. It will also be evident that by adjusting the position of the castings on the standard and the stop-collars upon the rod 15 the machine may be used to grind tumblers of any size large enough for the introduction of the gripper-head 19, and by varying the size of the gripper-head 19 to suit the different sizes of tumblers to be ground it is possible to grind tumblers of practically all sizes.

While the machine has been described as one especially adapted for grinding tumblers and though that is the principal object had in view, it will be seen that owing to the fact that the support for the article to be ground does not come in contact with the sides thereof it will be possible to grind articles of more or less irregular configuration laterally if the upper margin be in one plane.

In Figs. 11 and 12 of the drawings is shown an attachment for use on the machine to insure proper contact between the grinding-stone and the glass article.

Except when used by skilled workmen the machine will not always be so operated that the right amount of pressure is exerted between the article to be ground and the grinding-surface, and in the grinding of delicate pieces of glass, as in thin-stemmed goblets and the like, a certain amount of breakage will occur from time to time as the result of the application of too much pressure on the glass during the grinding process.

In the attachment illustrated in Figs. 11 and 12 means is provided for regulating exactly the degree of pressure exerted upon the glass throughout the grinding operation, and means is also provided for accurately increasing the pressure at a uniform rate from the beginning of the grinding operation until it is well under way.

The attachment above mentioned consists, generally speaking, in a mechanism attached to the machine, as illustrated in Figs. 11 to 13, inclusive, for raising the grinding member to such position that when the tumbler or other glass article is mounted in position for grinding upon the supporting-disk the grinding-stone will be at a slight distance above and out of contact with said glass article and in means for causing said grinding member to descend slowly under the influence of gravity into contact with said glass article and to press downward thereon with gradually-increasing pressure after the beginning of the grinding operation.

Considered in detail the attachment comprises castings 60 and 61, mounted upon a standard 3, as shown, and held in position by means of set-screws and devices presently to be described, which are associated with said castings for raising the spindle supporting the grinding-stone and causing it gradually to descend. The casting 60 is mounted a short distance above the casting 6 and has attached thereto at its front end lazy-tongs 62, which extend upward and are attached at their upper ends to a frame, (designated generally as 62,) which is mounted for reciprocatory movement in guide-lugs 64, projecting laterally from a hollow cylinder 65 at the top and bottom thereof. The hollow cylinder is rigidly mounted on the casting 61 and is provided at the bottom with a valve 65ª for controlling the speed of escape of air from the cylinder. The cylinder contains a piston 66, mounted for reciprocation within said cylinder and having a rod 67, upon which said piston is mounted, connected at its upper end with the upper transverse member of the frame 63.

At the back of casting 6, near the upper end, is mounted, by means of a set-screw 68 and a set-nut 69, a bar 70, upon the ends of which are pivotally mounted the terminals of a yoke 71, which encircles the upper part of casting 6 and has at the front end thereof a stud 72, on which is pivotally mounted a link 73, the upper end of which is secured to said lazy-tongs 62 at a point near the bottom, as shown. The yoke 71 has mounted thereon at either side a rotatable disk 74, which is disposed in a vertical plane, as shown, and is adapted to contact with the under surface of a disk 75, disposed in horizontal plane and rigidly secured to the spindle 10, which carries the grinding-stone 14. The two disks 74 are preferably so placed that when brought into contact with the under surface of disk 75 the points of contact between disks 74 and disk 75 lie approximately in one of the diameters of the disk 75.

In order to raise the yoke 71 so as to lift the grinding-stone 14, I provide a handle 76 on the tongs 62, near the upper end thereof, as shown, and this handle also serves as means for raising the frame 63, which carries the piston 66.

The operation of the device is as follows: When a tumbler or other glass article is to be ground, it is introduced into the machine in the manner explained in a preceding paragraph; but the lever 33, which serves to raise the supporting-disk 25 into position during the grinding process, will be firmly secured in position and not held by the operator of the machine to control the degree of pressure between the grinding member and the glass article. The glass article having been placed in position for grinding, the handle 76 will be grasped and the upper portion of lazy-tongs 62 raised until the frame 63 is at the upward limit of its movement. This expansion of the lazy-tongs while causing the movement of the frame 63 through a considerable distance will raise the yoke 71 only a very slight distance—say one-half an inch—and will cause the disks 74, carried by said yoke, to engage the under surface of disk 75 on the spindle 10, forcing said disk upward and raising the spindle and the grinding-stone carried thereby. Motion having been imparted to the spindle in the manner already described in a preceding paragraph, the handle 76 will be released and the spindle and grinding-stone allowed to descend under the influence of gravity, the rate of descent being controlled by the rapidity with which the piston 66 descends in the cylinder 65. The speed of descent of the piston in the cylinder is determined by the rate of escape of air from said cylinder and this is regulated by means of the valve 65ª at the lower part of the cylinder.

It will be seen that by means of the mechanism described in the immediately-preceding paragraphs the grinding member 14 may be caused to descend very slowly in order to be brought very gradually into contact with the upper surface of the article to be ground, thereby preventing the crushing of delicate articles, but may be allowed to descend rapidly, so as to secure as rapid grinding as possible of articles of considerable strength which are not liable to breakage during the grinding process.

It will be noted that while in describing the operation of the device it has been assumed that the grinding member was stationary at the time that the article to be ground was placed in position upon the support therefor it is not necessary to stop the motion of the machine after the grinding of each article to permit the removal of the ground article from the machine or the insertion of an unground article in its stead. After the grinding of an article is completed the grinding member may be raised without arresting the movement thereof and held in raised position by means of the handle 76 while the standard 24 is lowered and the ground article removed from the supporting-disk 25. Another article may then be placed in position on the disk 25 and raised to grinding position by means of the lever 33 before the handle 76 is released and the rotating stone 14 allowed to descend to engage the upper surface of the article to be ground. It will also be observed that as the disks 74 pass out of contact with the disk 75 before the yoke 71 reaches its lowermost position the pressure of the grinding-stone upon the article to be ground will not increase appreciably after the yoke 71 is swung downward far enough to cause the disks 74 to pass out of contact with the disk 75. After that time the pressure of the grinding-stone upon the article to be ground will be substantially uniform.

One of the special advantages of the attachment described in the preceding paragraphs is that by setting the valve 65ª at any desired position practically uniform pressure upon the article to be ground may be secured, thus insuring uniform effects upon the articles ground provided the said articles are of uniform thickness and size. This is of course especially desirable in grinding tumblers or other articles of thin glass and expensive workmanship in which perfect uniformity is essential to command the highest prices.

Having thus described the construction and operation of my invention, what I claim as new, and desire to secure by Letters Patent, is—

1. The combination in a machine for grinding glass articles of a suitable supporting structure, a hollow vertical spindle rotatably mounted in said supporting structure, a horizontally-disposed grinding-stone mounted at the lower end of said spindle, a spring-pressed rod extending downward through said spindle and provided at its lower end with a gripper-head, and a support for a glass object under said head.

2. In a machine for grinding glass articles, the combination of a supporting-frame, a hollow vertical spindle rotatably mounted in said frame, a horizontally-disposed stone rigidly mounted at the lower end of said spindle, a rod extending downward through said spindle, and provided at its lower end with a gripper-head, a spring encircling said rod and pressing it downward, means for varying the tension of said spring, and a vertically-movable support for a glass object under said gripper-head.

3. The combination in a grinding-machine for glass objects of a supporting-frame, a hollow vertical spindle rotatably mounted in said frame, a spring-pressed rod extending downward through said spindle and provided at its lower end with a gripper-head, and a vertically-movable rod under said spring-pressed gripper-head and provided at its upper end with a recessed disk for supporting a glass object.

4. The combination in a machine for grinding glassware, of means for supporting the article to be ground, a rotary grinding member movable longitudinally of its axis of rotation, and means for automatically moving said grinding member longitudinally of its axis of rotation during the grinding process.

5. In a grinding-machine for glass objects, the combination of a horizontally-disposed grinding-stone, means for rotating said stone, and devices for holding a glass object in contact with the under surface of said stone, said holding devices comprising a spring-pressed rod extending downward through the center of said stone and provided at its lower end with a gripper-head, a vertically-movable rod under said spring-pressed rod and provided at its upper end with a support for a glass object, means for raising said vertically-movable rod comprising lazy-tongs connected at the lower end with the base of the machine and at the upper end with said vertically-movable rod, a lever connected with said lazy-tongs, and means for securing said lever in position to keep said vertically-movable rod in elevated position.

6. The combination in a machine for grinding glass articles, of means for supporting the article to be ground, a rotary grinding member movable longitudinally of its axis of rotation, means for automatically moving said grinding member longitudinally of its axis of rotation during the grinding operation, and means for controlling the rate of longitudinal movement.

7. In a machine for grinding glass articles, the combination of means for supporting the article to be ground, a rotary grinding member, and automatic means for gradually increasing the pressure between said grinding member and the article to be ground.

8. The combination in a machine for grinding glass articles, of means for supporting the article to be ground, a rotary grinding member, means for moving said grinding member away from the article to be ground, and automatic means for returning said grinding member into contact with the article to be ground.

9. The combination in a machine of the class described, of means for supporting an article to be ground, a rotary grinding member, means for moving said grinding member away from the article to be ground, and fluid-controlled means for causing said grinding member to move toward the article to be ground at a uniform rate of speed.

10. The combination in a machine of the class described, of a suitable supporting structure, means provided thereon for holding an article to be ground, a rotatable spindle slidably mounted on said supporting structure, a grinding member rigidly secured to said spindle, connections between said pivoted member and said spindle, and means for swinging said pivoted member on its pivot to slide said spindle in its bearings.

11. The combination in a machine of the class described, of a supporting structure, a rotatable spindle mounted in said supporting structure, a grinding member rigidly secured to said spindle, means for supporting an article to be ground, means comprising a pivoted arm carrying a rotatable disk, and a disk rigidly secured to said spindle and adapted to be engaged by said rotatable disk for moving said spindle longitudinally of its axis to move said grinding member out of contact with the article to be ground.

12. The combination in a machine of the class described, of a supporting structure, means provided thereon for holding an article to be ground, a vertical spindle rotatably and slidably mounted in said supporting structure, a grinding member rigidly secured to said spindle over the article to be ground, a disk rigidly secured to said spindle, a pivoted arm mounted on said supporting structure, a disk rotatably mounted on said arm and adapted to engage the first-mentioned disk, and means for raising the free end of said pivoted arm to lift the grinding member out of contact with the article to be ground.

13. The combination in a machine of the class described, of a suitable supporting structure, means for holding an article to be ground provided on said supporting structure, a spindle rotatably and slidably mounted in said supporting structure, a grinding member mounted on said spindle, means for raising said spindle, and means for controlling the descent of said spindle, said means comprising a hollow cylinder, a valve associated with said hollow cylinder, a piston movable in said cylinder, and connections between said spindle and said piston.

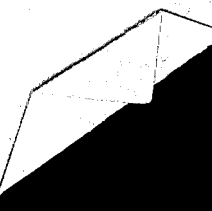

14. The combination in a machine of the class described, of a supporting structure, means for holding an article to be ground, a vertical spindle rotatably and slidably mounted in said supporting structure, a hollow cylinder mounted on said supporting structure, a piston movable in said cylinder, a valve associated with said cylinder, lazy-tongs provided on said supporting structure and fixed at the lower end, said lazy-tongs being connected near the lower end with said spindle, and near the upper end with said piston.

In testimony that I claim the foregoing as my own I have hereto affixed my signature in the presence of two witnessses.

WILLIAM FRANCIS ALTENBAUGH.

Witnesses:
GEO. M. HOKE,
H. F. NEUFER.